United States Patent
DaGraca et al.

(10) Patent No.: US 6,646,676 B1
(45) Date of Patent: Nov. 11, 2003

(54) NETWORKED SURVEILLANCE AND CONTROL SYSTEM

(75) Inventors: Paul DaGraca, Middlesex, NJ (US); Anthony Vetro, Staten Island, NY (US); Ajay Divakaran, Denville, NJ (US); Huifang Sun, Cranbury, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 645 days.

(21) Appl. No.: 09/612,876

(22) Filed: Jul. 10, 2000

Related U.S. Application Data (63) Continuation-in-part of application No. 09/573,467, filed on May 17, 2000.

(51) Int. Cl.[7] .................................................. H04N 7/18
(52) U.S. Cl. ........................................ 348/155; 340/541
(58) Field of Search ................................ 348/143, 154, 348/155; 340/541; H04N 7/18

(56) References Cited

U.S. PATENT DOCUMENTS

| | | | |
|---|---|---|---|
| 5,471,239 A | 11/1995 | Hill et al. .................. 348/155 |
| 5,666,157 A | 9/1997 | Aviv ........................... 348/152 |
| 5,969,755 A | * 10/1999 | Courtney ..................... 348/155 |
| 6,031,582 A | 2/2000 | Nishikawa et al. .......... 348/699 |
| 6,064,303 A | 5/2000 | Klein et al. ................. 340/506 |
| 6,097,429 A | * 8/2000 | Seeley et al. ................ 348/154 |
| 6,424,370 B1 | * 7/2002 | Courtney ..................... 348/155 |
| 6,570,496 B2 | * 5/2003 | Britton ........................ 340/541 |

OTHER PUBLICATIONS

ISO/IEC JTC1/SC29/WG11, N2861, MPEG–7 Applications v. 9 Jul., 1999 Vancouver, BC, Canada.

* cited by examiner

*Primary Examiner*—Howard Britton
(74) *Attorney, Agent, or Firm*—Dirk Brinkman (57) ABSTRACT

A surveillance and control system includes a feature extraction unit to dynamically extract low-level features from a compressed digital video signal, a description encoder, coupled to the feature extraction unit, to encode the low-level features as content descriptors. An event detector is coupled to the description encoder to detect security events from the content descriptors, and a control signal processor, coupled to the event detector, to generate control signals in response to detecting the security events.

16 Claims, 5 Drawing Sheets

NETWORKED SURVEILLANCE AND CONTROL SYSTEM

CROSS-REFERENCE TO RELATED APPLICATION

This is a continuation-in-part of U.S. patent application Ser. No. 09/573,467, filed May 17, 2000 by Vetro et al.

FIELD OF THE INVENTION

The present invention relates generally to surveillance systems and, more particularly, to a surveillance system for capturing and storing information concerning security events, and responding to those events using a network.

BACKGROUND OF THE INVENTION

Video Compression

The Moving Pictures Expert Group (MPEG) is a family of standards used for the quality and efficient coding of video and audio information in digital compressed format. Several MPEG standards exist, such as MPEG-1 for coding of still images, MPEG-2 for coding moving pictures (video), MPEG-4 for coding multimedia.

Content Description

The most recent standardization effort taken on by the MPEG committee is that of MPEG-7, formally called "Multimedia Content Description Interface." This standard plans to incorporate a set of descriptors and description schemes (DS) that can be used to describe various types of multimedia content. The descriptor and description schemes allow for fast and efficient searching of content that is of interest to a particular user.

It is important to note that the MPEG-7 standard is not meant to replace previous coding standards, rather, it builds on previous standard representations. Also, the standard is independent of the format in which the content is stored.

The primary application of MPEG-7 is expected to be for use in search and retrieval applications. In a simple application environment, a user specifies some attributes of a particular object. At this low-level of representation, these attributes may include descriptors that describe the texture, motion and shape of the particular object. To obtain a higher-level of representation, one may consider more elaborate description schemes that combine several low-level descriptors.

Video Receiver

Figure 1:
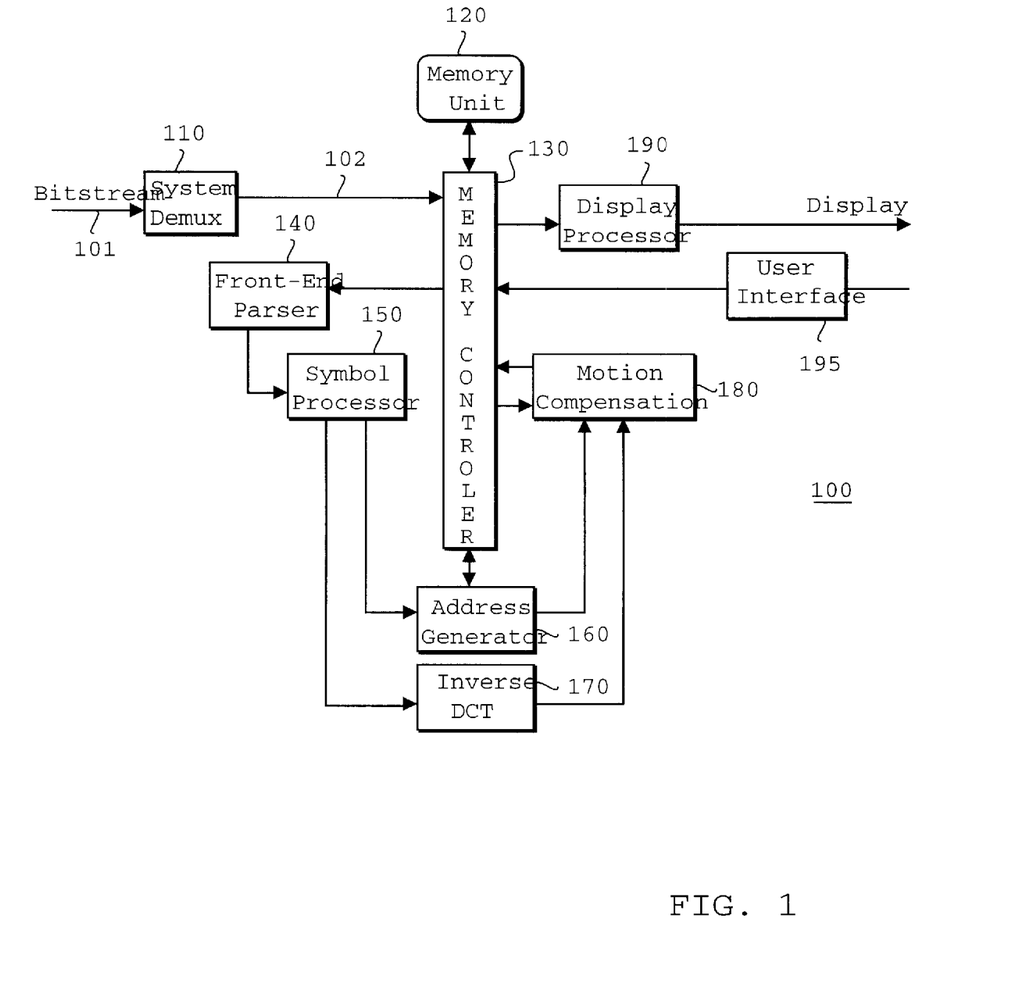
FIG. 1 is a block diagram of a prior art video receiver.

The prior receiver 100 is shown in FIG. 1. The receiving and decoding takes place in two basic stages. During a first stage, features are extracted from the compressed video, and during a second stage, the extracted features are used to reconstruct the video.

During the first stage of decoding, a demultiplexer (demux) 110 accepts a compressed bitstream 101. The demux synchronizes to packets of the received bitstream, and separates the video, audio and data portions of the bitstream into primary bitstreams 102. The still compressed primary bitstreams are sent to a shared memory unit 120 using a memory controller 130. A front-end parser 140 parses the compressed bitstreams. The parser 140 is responsible for extracting the higher level syntax of the bitstreams, e.g., above the slice-layer in the MPEG-2 standard.

Below this level, bits are transferred to a symbol processor 150, which is mainly responsible for variable-length decoding (VLD) operations. In the MPEG bitstream, for example, the motion vectors and discrete cosine transform (DCT) coefficients are encoded by variable-length codes, along with other information such as macroblock modes, etc.

During the second stage of decoding, additional blocks are turned on to reconstruct the video signal. From the symbol processor, extracted macroblock and motion vector information are sent to an address generator 160, and DCT information is sent to an inverse DCT 170.

The address generator 160 is responsible for generating the memory addresses where the video data are to be written and read in the memory unit 120. The address generator depends heavily on such information such as a prediction mode, location of current block, and motion vector value. Some of this information is passed on to a motion compensation unit 180, which combines data read from the memory unit with data received from the IDCT 170.

In the case of intra mode prediction, there may be no data read from memory because data read from memory are predictive information. Reconstructed data are written to the memory 120 from the motion compensation unit 180. When it is time for this data to be displayed, a display processor 190 reads the data for any additional processing that may be needed. A user interface 195 interacts with the memory controller 130 so that the limited, positional access can be realized.

Networking

Computing technology is now inexpensive enough that it is possible to network many intelligent electronic devices throughout homes and enterprises. It is now is also possible to move digital data, in the form of audio, images, and video between devices, to share the data information with other users using the World Wide Web.

Universal Plug and Play (UPNP) is one initiative to provide easy-to-use, flexible, standards-based connectivity to networked devices. UPNP is an architecture for networking PC's, digital appliances, and wireless devices. UPNP uses TCP/IP and the Web or some other Simple Control Protocol (SCP) to control and transfer data between networked devices in the home, enterprises and everywhere else a Web connection can be made.

UPNP is intended to work in a network without special configuration. A device can dynamically join the network, obtain an Internet Protocol (IP) address, announce itself and its capabilities upon request, and learn about the presence and capabilities of other devices in the network. In addition to joining the network, the device can leave the network without leaving any undesired state behind.

Security Systems

Most prior art surveillance systems use closed-circuit television (CCTV) to acquire a video of indoor and outdoor scenes. Security systems typically display the video on monitors for simultaneous viewing by security personnel and/or record the video in a time-lapse mode for later playback.

Serious limitations exist in these approaches. Humans are limited in the amount of visual information they can process in tasks like video monitoring. After a time, significant security events can easily go unnoticed. Monitoring effectiveness is additionally reduced when multiple videos must be monitored. Recorded video for later analysis does not provide for real-time intervention. In addition, video recordings have limited capacity, and are subject to failure.

Typically, the video is unstructured and unindexed. Without an efficient means to locate significant security events, it is not cost-effective for security personnel to monitor or record the output from all available cameras. Video motion detection can be used to crudely detect security events. For example, any motion in a secured area can be considered a significant event. However, in complex scenes, most simple motion detection schemes are inadequate.

U.S. Pat. No. 5,594,842 describes a surveillance system that uses clustered motion vectors to detect events. U.S. Pat. No. 6,031,582 describes a surveillance system that uses signal-strength difference corresponding to motion vectors to detect events.

U.S. Pat. No. 6,064, 303 describes a PC-based home security system that monitors the surrounding environment to detect suspicious or uncharacteristic events. When a threshold event is detected, the system conducts close surveillance for an additional events. When the accumulated detected events exceed some threshold value, the security system takes an appropriate remedial action. The system detects sound and video events by pattern recognition. Sound events use prerecorded files processed by a fast Fourier transform to provide amplitudes at various discrete characteristic frequencies as a function of time, and detected video events are movement (size and duration), light contrast change, and dark to light change. The events have associated severities. Responses are telephone to appropriate numbers with prerecorded messages.

U.S. Pat. No. 5,666,157describes an abnormality detection and surveillance system that has a video camera for translating real images of a zone into electronic video signals at a first level of resolution. The system includes means for sampling movements of individuals located within the zone. The video signals of sampled movements is electronically compared with known characteristics of movements which are indicative of individuals having a criminal intent. The level of criminal intent of the individuals is then determined and an appropriate alarm signal is produced.

The MPEG-7 document ISO/IEC JTC1/SC29/WG11/N2861, "MPEG-7 Applications Document v.9," July 1999, describes a surveillance application, in which a camera monitors sensitive areas and where the system must trigger an action if some event occurs. The system may build its database from no information or limited information, and accumulate a video database and meta-data as time elapses. Meta-content extraction (at an "encoder" site) and meta-data exploitation (at a "decoder" site) should exploit the same database.

However, many security applications require real-time event analysis. The MPEG-7 Application Document does not provide information on how to achieve real-time performance. Furthermore, the actual meta-data that are to be extracted to achieve fast, robust and accurate event detection are not specified. Finally, this document does not say anything about the operation of the extraction unit and other networked devices.

It is desired to provide an improved surveillance system that uses video coding and networking technologies as described above.

SUMMARY OF THE INVENTION

The invention provides a surveillance and control system that includes a feature extraction unit to dynamically extract low-level features from a compressed digital video signal, and a description encoder, coupled to the feature extraction unit, to encode the low-level features as content descriptors. The system also includes an event detector coupled to the description encoder to detect security events from the content descriptors, and a control signal processor, coupled to the event detector, to generate control signals in response to detecting the security events.

The system can also include a telephone, a personal computer, and a video recorder coupled to each other by a network. The network includes a low-bandwidth network is for carrying the control signals and a high-bandwidth network for carrying the compressed digital video signal and the content descriptors. A memory unit stores the compressed digital video signal, the content descriptors, the control signals, user input, and configured user preferences.

The surveillance and control system further includes a symbol processor, coupled to the feature extraction unit, to extract motion vectors and macroblocks and DCT coefficients from the compressed digital video signal, and a bitstream processor, connected to the memory unit, to produce an output compressed digital video signal including the compressed digital video signal and the content descriptors.

DETAILED DESCRIPTION OF THE PREFERRED EMBODIMENT

Networked Surveillance and Control System

Figure 2:
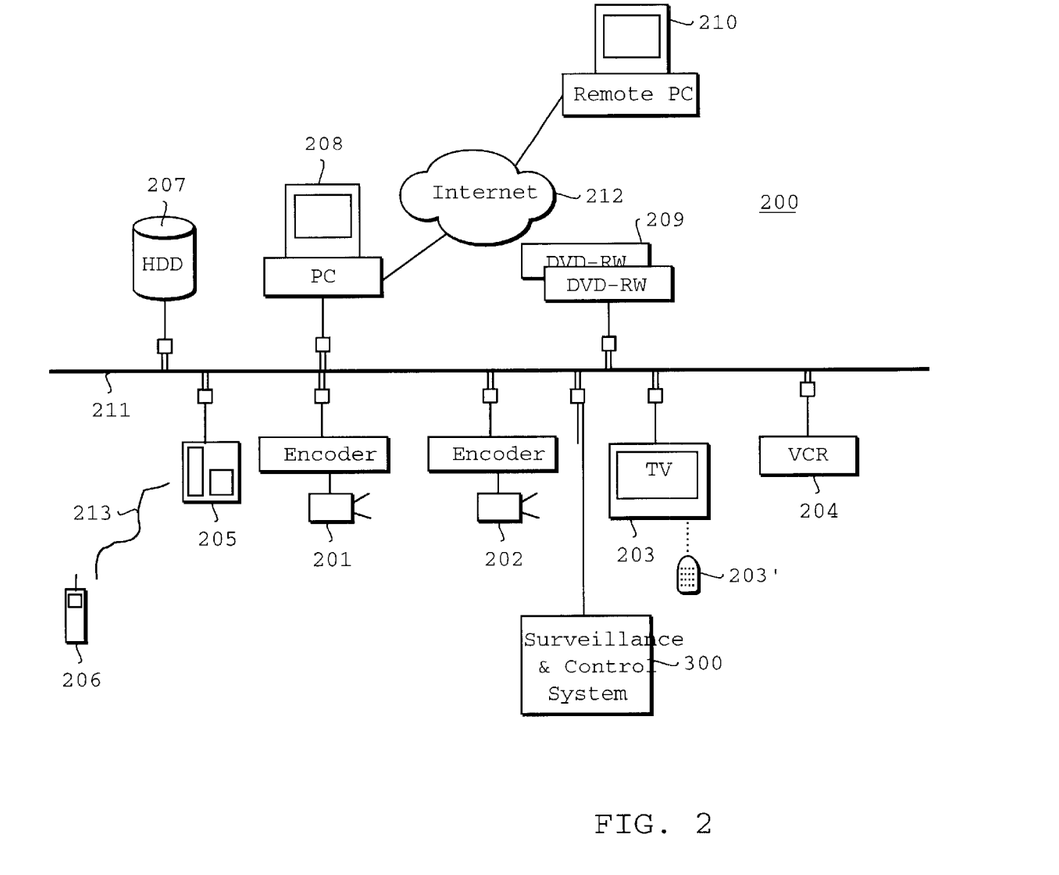
FIG. 2 is a block diagram of a network that includes a surveillance and control system according to the invention.

FIG. 2 shows a network 200 that includes a surveillance and control system 300 according to the invention. The system includes one or more digital video cameras 201–202, a monitor (TV) 203 and a remote controller 203', a video recorder (VCR) 204, a telephone 205, a wireless telephone 206, a storage device (HDD) 207, a personal computer 208, a digital versatile disk (DVD-RW) 209, and a remote PC 210. The devices 201–210 and the surveillance and control system 300 can communicate with each other via a network. Here, the network has local 211, wide-area 212, for example, the Internet, and wireless 213 portions.

Network Operation

During operation, the network carries low-bandwidth control signals, and high-bandwidth data messages or video content.

Control Signals

The control signals may be transported between devices using UPNP, Powerline, HomePlug, Phoneline or some other protocol. The control signals enable different compatible devices to control other devices as well as share and communicate between each other. For example, the control signals can cause the cameras 101–102 to turn on and off, to move (up/down, left/right) to zoom (in/out). The messages can be automatic, or user generated. For example, the cameras can be turned on and off periodically, or the user can control the cameras with the remote 203', PC (local 208 or remote 209, VCR 204, DVD 209, or TV. Similarly, the PC or phones can be used to send control signal to other appliances and consumer electronics such as VCR and DVD.

Video Signals

Video signals can be sent over the network 211 using the IEEE-394 standard. When the cameras are turned on, the video can be displayed on a monitor as a full window, picture in picture (PIP) window. The video may also be recorded by the VCR, DVD or HDD. The video is encoded to include high-level meta-data; for example, MPEG-7 content-based descriptors for future manipulation and viewing. The encoding can be done at the cameras, the PC or the surveillance and control system 300. The PC can also perform transcoding, that is, convert a video from MPEG-2 or 4 to another more desirable coded representation, possibly at a lower bit-rate, a lower spatial resolution, or NTSC format. The encoded video can be recorded on the VCR, DVD, or HDD. The encoding is described in greater detail below.

A user can inspect the video after recording using a video browser for fast and efficient access to recorded security events. For example, if the user has recorded a video of a home while gone for a week, then the user can only view scenes with persons approaching the house, and not the other hundred hours of the video without significant security events.

In response to detecting a security event, the system, using control signals to the telephone, can dial an appropriate emergency agencies such as police, fire, or ambulance. The system can also ring any other selected telephone number depending on the nature of the event. Furthermore, the emergence of third generation (3G) cellular phones, it becomes possible to send the camera output to any 3G enabled telephone.

Overview of Surveillance and Control System

Figure 3:
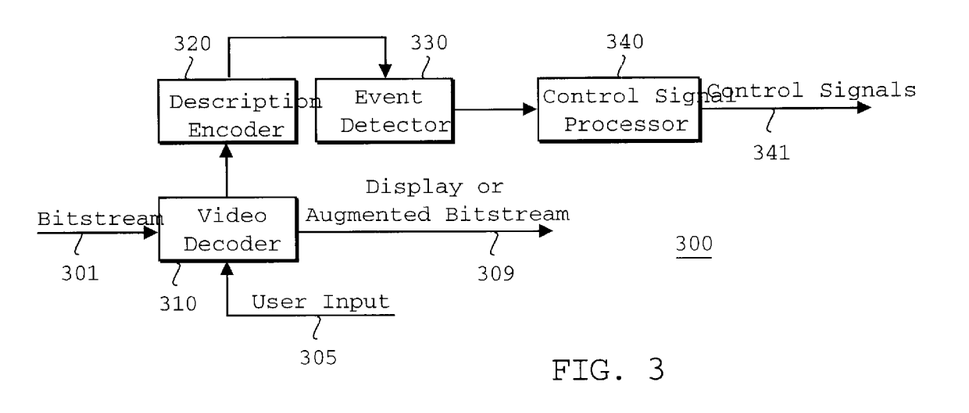
FIG. 3 is a high-level block diagram of a surveillance and control system for detecting and signaling security events from a compressed video signal.

FIG. 3 shows the major components of the surveillance and control system (SCS) 300. The SCS includes a video receiver/decoder/display ("decoder") connected to a description encoder 320 and an event detector 330. The description encoder 320 and event detector 330, described in greater detail below, are also connected together. A control signal processor 340 is coupled to an output of the event detector. The decoder accepts user input 305 to configure the SCS. The type of input that can be accepted and its impact on the operation of the SCS is described in greater detail below. As with the system shown in FIG. 1, a compressed digital input bitstream 301 is accepted by the video decoder 310, and output 309 of the SCS can include a displayable video stream, control signals, and an augmented bitstream. The control signal generator provides control signals 341 in response to detected security events. As an advantage, the augmented bitstream includes information useful for detecting security events.

To enable the networked devices 201–210 for improved security operations, our system performs feature extraction using the description encoder 320. The description encoder generates content descriptions to augmented the output bitstream. The augmented bitstream can include the original input bitstream 301.

The event detector 330 uses the extracted features to generate a higher-level understanding of the content and signal security events to the decoder 310. In response to the security events, the control signal processor 340 generates control signals to transmit to the network devices 210–210.

Figure 4:
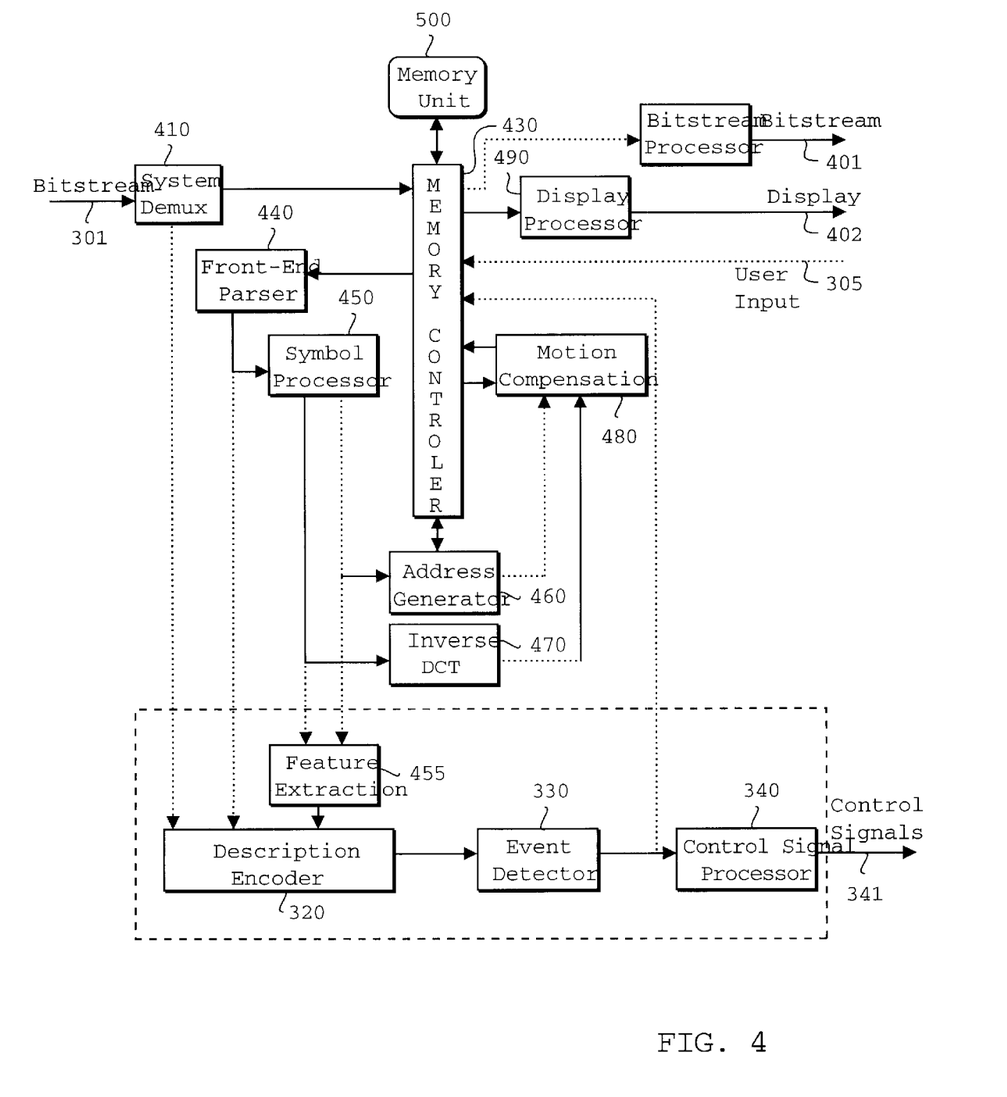
FIG. 4 is a low-level block diagram of the surveillance and control system of FIG. 3.

FIG. 4 shows the SCS 300 in greater detail. Our SCS differs from the playback system in FIG. 1 with regard to internal operation and output. The dotted lines in FIG. 4 indicate connections to components that are not part of prior art video playback system.

The SCS 300 includes a demultiplexer (demux) 410, a memory unit 500, and a memory controller 430, a front-end parser 440, and a symbol processor 450. These system components are used for feature extraction 455 during a first stage of the decoding the input bitstream.

The system also includes an address generator 460, an inverse DCT (IDCT) 470, a motion compensator 480, and a display processor 490. These components are for image reconstruction and display 402 during the second stage of decoding. In certain operational modes described below, and in contrast with prior art receivers, these later components of the second stage can be turned off so that all of the memory bandwidth and processing priority are dedicated to feature extraction and the first stage of decoding.

The changes to internal operation are a result of a feature extraction unit 410 and an MPEG-7 description encoder 320. The feature extraction unit 455 performs dynamic feature extraction as described herein. Low-level data, including motion vector information, DCT coefficients and shape information are passed from the symbol processor 450 to the feature extraction unit 455.

As described below, this low-level data can be mapped to MPEG-7 descriptors, which are useful for search and retrieval. The mapping is performed by the description encoder 320. The encoder can also receive information from the front-end parser 440 and system demultiplexer 410.

In a preferred embodiment, the encoder instantiates a description scheme according to a selected standard, for example, the MPEG-7 standard. It should be understood that other types of encoders can instantiate to other standards. Encoding to a standard enables the interoperability of the devices 201–210. The description schemes are passed to the event detector 330. The extracted data can also be passed through the memory controller 430 to the main memory unit 500. There, the extracted data can be used to augment the input bitstream.

The event detector 330 is responsible for the detection security events, and signaling such events to the rest of the system, and particularly to the control signal processor 340. The user input 305 is used to configure the system for personal information and preferences. Personal information includes contact telephone numbers, e.g., work, cellular, pager, email address, police, fire, ambulance, priority of contact, i.e., send e-mail first, then call police, if no response within a specified amount of time, or alert all contacts, time/date customization, e.g., call work and send email before 6 pm, call cellular phone after 6 pm), where to send the output of video, e.g., VCR, DVD, TV, PC, monitor, etc.

Figure 5:
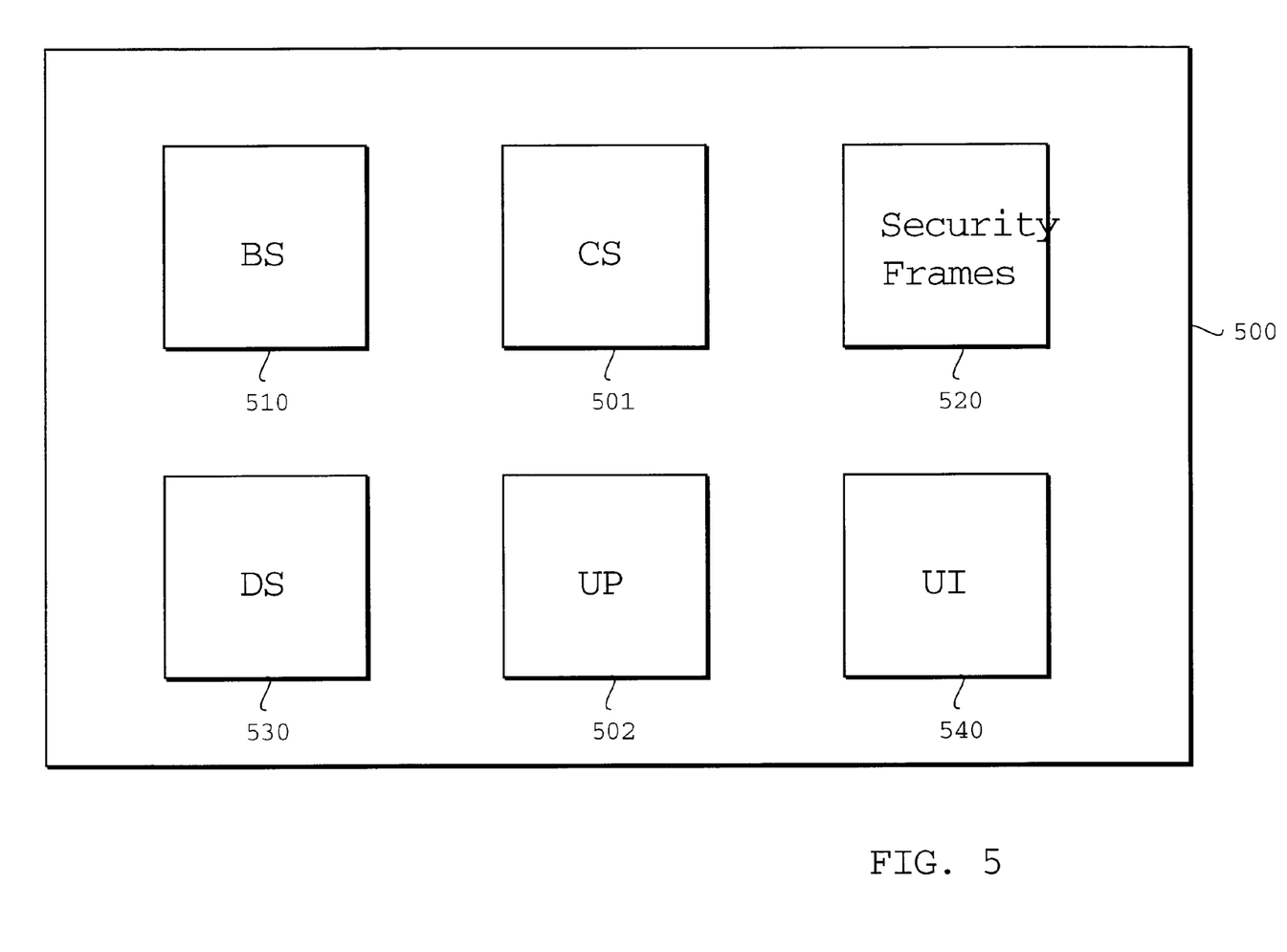
FIG. 5 is a block diagram of a memory unit of the surveillance and control system of FIG. 5.

As shown in FIG. 5, the memory 500 of our security system stores four types of video data, all or part of the original compressed bitstream (BS) 510, select frames for reconstruction or to summarize video of interest (security frames) 520, description schemes (DS) 530 and user input (UI) 540. The memory also stores control signals (CS) 501 output by the event detector, and configured user preferences (UP) 502.

In addition to having feature extraction capabilities, our system can also output an augmented bitstream 401 via a bitstream processor 491. The bitstream processor receives this data from the main memory unit via the memory controller. The output bitstream can include compressed content, i.e., the original bitstream 301, content summaries, and content descriptions. The bitstream processor formats the information in a way that is suitable for transmission to a user that is remote from the content or for transmission over the network to a recording device.

The purpose of outputting content and/or its corresponding description is to provide a user with information that can help to trace back to security events that have been signaled. The description can be used for fast retrieval of key point in the content.

The actual control signals 341 that are transmitted over the network are generated by a control signal processor 340. The control signal processor receives notice that a security event has been detected from the event detector, consults the user preferences, and generates the appropriate control signals to the corresponding network devices.

The types of control signals can be classified into three categories: (i) security contact information, as provided by the user input, (ii) device control parameters, such as camera movements, switching and operation, and action data, such as record, initiate telephone call, and (iii) routing information, e.g., send the augmented bitstream 401 to HDD 207 and send appropriate telephone number to telephone 205 or the PC 210.

System Operation

Our SCS 300 extracts features dynamically from a compressed digital video signal. Using these features, security events can be detected and actions can be automatically be initiated.

A key feature of our system is its interoperability with other devices. Interoperability is achieved by using standard compression techniques to deliver and playback the content of a video, and standard description schemes (DS) to describe, retrieve and access the content. Our SCS can operate in a number of different modes depending on the status of events.

Partial Decoding—Searching for an Event, No Output Action

In a first mode, the received compressed bitstream is parsed and partially decoded by our SCS. Partial decoding is defined as including only the decoding operations of the first stage. In this mode, decoding of the second stage to reconstruct the video is disabled. In other words, in this partial decoding mode, unlike a traditional receiver, there is no address generation, no computation of the inverse DCT, no motion compensation, and, of course, no display. That is, the second stage decoding is by-passed. The main objective of the SCS in this mode is to search for a security event by means of the features that have been extracted from the compressed video signal.

Because there is no display, all of the memory bandwidth can be dedicated to the partial decoding and feature extraction, encoding and event detection. Consequently, in this mode, the system is able to efficiently process selected elements of the compressed input bitstream to extract both low-level and high-level information about the content. Partial decoding can extract significant features in a relative short time. For example, hours of video can be processed in minutes, or less.

Examples of extracted bitstream elements that are useful for this purpose are motion vectors in the bitstream, DCT coefficients and picture/macroblock coding modes. These elements are output from the symbol processor 450 and the front-end parser 440. Additionally, information may also be extracted from auxiliary bitstreams. Such information is output from the system demultiplexer (demux) 410. An example of such data are MPEG-7 meta-data and may include annotated information about the content, such as the dates and time stamp information.

The advantage that one gains in partially decoding the bitstream and extracting information is that features can be gathered and security events can be detected in a relatively short time. This partial decoding mode is most applicable for passive surveillance, when no specific event has yet been detected.

Full Decoding—Event has been detected or Continuous Display Output

In contrast to the first partial decoding mode, a second mode differs in that the video being analyzed is also reconstructed and output to a local display device. In this full decoding mode, features are extracted and encoded as content descriptors in the same way as described for the partial mode. However feature extraction is done concurrently with displaying of the video data. That is, the feature extraction and encoding is dynamic as the video is being played back.

This mode of operation is applicable to systems with single or multiple cameras and single or multiple bitstreams being input to the SCS, where there is always a signal being displayed. There may be a single display device or multiple display devices. With multiple cameras and a fewer display devices, the SCS can control the bitstream to be reconstructed and where the reconstructed bitstream should be displayed. The main point is that the compressed video signal is analyzed while reconstructing and displaying the video.

In a special case, with a single camera and single display device, the SCS can enter the full decoding mode when a security event has been detected.

Hybrid Decoding

In a third mode, the bit stream is partially decoded while the compressed bitstream is received and processed at a highest possible bit rate. The partially decoded bitstream is stored in the memory unit 500. Concurrently, the stage two reconstruction also takes place from the decoded bitstream stored in the memory unit so that the video can be displayed. During the period of time required to extract and encode the features and detect the event, the frame rate can be reduced to, for example, fifteen frames per second, or less, so that more system resources are available to the feature extraction, encoding and event detection.

In a typical example application of this mode, the features are continuously extracted from the video. After a security event is detected, more system resources may be needed for analysis of the event. In that case, the resources for decoding have a lower priority and there may only be enough resources to display, record or transmit a lower temporal resolution video signal, which is still sufficient.

A key point, in any of these modes, is that meta-data, compliant with the selected standard, are extracted from the available compressed data. The available data may only be low-level features that are extracted from the compressed bitstream or information from an auxiliary data stream, even including some MPEG-7 meta-data, which may or may not be complete. In this way, interoperability with other devices is achieved.

Feature Extraction

Feature extraction from compressed bit-streams has been extensively reported in the literature. The chief advantage of such extraction is that it is computationally simple because it avoids computation of inverse DCT's by relying on the output of the demux, the parser, and the symbol processor. The output of the symbol processor contains motion vectors information and DCT coefficients.

The features most amenable to such extraction are color, luminance and motion. Note also that the output of the feature extraction unit 455 goes to the description encoder 320 which instantiates the descriptor values. The descriptor instantiations are then used by the event detector 330.

Luminance and Color—

Note that with I-Frames, the output of the symbol processor 340 contains the "dc" values of the luminance and chrominance of the blocks. Thus, "dc-images" of the I-frames can be constructed using the output of the symbol processor 450. It is well known how to detect scene changes using dc-images. It is also possible to determine color descriptors such as dominant color, color histogram, compact color, GOF/GOP color histogram, color structure histogram, color layout, etc., from dc-images. For example, consider the binary syntax of the dominant color descriptor in Table A below:

TABLE A

| Dominant_Color { | No. of bits | Mnemonics |
|---|---|---|
| ColorSpace | Specified in 3.1.1.3 | |
| ColorQuantization | Specified in 3.4.1.3 | |
| DominantColorsNumber | 3 bits | uimsbf |
| ConfidenceMeasure | 5 bits | uimsbf |
| } | | |
| struct DominantColor{ | No. of bits | |
| ColorValue | As defined in the color space | |
| Percentage | 5 bits | uimsbf |
| } | | |

Note that with a MPEG compressed video signal, the Color Space defaults to YUV or YcrCb, the Color Quantization, i.e., the number of bins, the beginning value of the color thresholds, etc., is decided by the feature extraction unit itself, as are the number of dominant colors. The Confidence Measure, Color Value and the Percentage are then determined from the image itself by using the dc value of the color of a macro-block as the color of every pixel that belongs to that macroblock. This briefly illustrates how the dominant color can be determined from the output of the symbol processor 450.

The output of the symbol processor has to be processed differently to get the dc-images from P-frames. The processing is different because macroblocks are usually predictively coded. To obtain the dc component, methods to perform the motion compensation in the DCT domain, such as those described in U.S. patent application No. 08/742,124 "Digital video decoder and method of decoding a video signal" may be used. Note that this computational overhead is significantly lower than that which is required by computing the inverse DCT.

Motion

Motion features are relatively easy to extract in the compressed domain because for motion compensated frames the output of the symbol processor contains the motion vectors for each macro-block. Several approaches to feature extraction from motion vectors are possible, see U.S. patent application No. 09/236,838 "Method of feature extraction of video sequences."

The MPEG-7 motion descriptors that can be determined in the compressed domain include Motion Activity, Camera Motion, Motion Trajectory and Parametric Motion. Consider the Binary representation syntax of the motion activity descriptor as shown in Table B:

TABLE B

| MotionActivity { | No of Bits | Mnemonic |
|---|---|---|
| Intensity | 3 | uimsbf |
| DirectionFlag | 1 | blsbf |
| SpatialDistributionFlag | 1 | blsbf |
| TemporalDistributionFlag | 1 | blsbf |
| If (DirectionFlag == 0) | | |
| DominantDirection | 3 | uimsbf |
| If (SpatialDirectionFlag == 0) | | |
| SpatialParameters={Nsr,Nmr,Nlr} | 6,5,5 | uimsbf |
| If (TemporalDistributionFlag == 0) | | uimsbf |
| TemporalParameters={$N_0,N_1,N_2,N_3,N_4$} | 5*6 | uimsbf |
| } | | |

Note that all the fields shown above can be calculated from the motion vectors, which are output from the symbol processor. For example, the intensity parameter is calculated by first computing the standard deviation of the motion vector magnitude, then quantizing the standard deviation to a 3-bit value.

Meta-Data Encoder

In MPEG-2 or MPEG-4, there is a well-specified encoder structure that must be used to generate a compliant bitstream. Conformance points are based on profile/level definition, i.e., an MPEG-2 Main Profile @ High Level (MP @ HL) encoder is restricted in terms of picture size, data rate, etc. However, we know that there must be some block to do motion estimation, a block to do DCT, etc. If we are operating in one of the scalability profiles, where we must encode a base and enhancement layer, then we know how the encoder structure needs to change. This is clearly defined by the standard.

In MPEG-7, instantiating description scheme is like an MPEG-7 encoder. However, the wide array of description schemes pertains to many different types of meta-data. How each type of data is generated may be unique and not specified by the standard. Because MPEG-7 is not likely to specify how the description schemes will be instantiated, this is a normative part of the standard, there is no structure to an MPEG-7 encoder. In this way, each DS must be instantiated on a case by case basis and can make sense within the scope of a particular application.

The point here is that a generic MPEG-7 encoder does not make sense unless there is a specific goal or application in mind. The objective is to provide improved content-based access, therefore the description schemes that our SCS will instantiate and the method of instantiation is unique to our system and will be described in the following sections.

Another point to make clear is that our security system encodes meta-data to achieve interoperability with other devices. If not for interoperability, encoding meta-data in compliance with the MPEG-7 standard is not needed. A system may simply use its own proprietary descriptors and description schemes that are internal and understood only by that particular system. In this case, augmented bitstreams do not need to be output either.

Details of Description Scheme Instantiator

Description schemes (DS) can be viewed as containers for descriptors. They can also be viewed as data structures that organize various descriptors. Consider the semantics of the MPEG-7 VideoSegment Description Scheme (DS) described in Appendix A as taken from the MPEG-7 Multimedia Description Scheme Working draft.

Notice how the VideoSegment DS encapsulates the Color and Motion Descriptors we alluded to in the section on descriptors. In this case, the description scheme can be instantiated by determining each of the constituent descriptors as described earlier. Note that the VideoSegment DS does lend itself to instantiation through feature extraction in the compressed domain. Thus DS's allow the use of individual descriptors by themselves, along with a combination of other descriptors to enable the surveillance application that is described here.

The VideoSegment DS is an example of the MPEG-7 DS's that describe structural characteristics of content. Other such DS's include the Segment DS and its children such as the Moving Region DS etc. Other DS's emphasize applications such summarization which is enabled by the Summary DS.

The Weight DS expresses the relative weighting of various descriptors in a description scheme, thus it can be instantiated at the MPEG-7 DS instantiator as per requirements. The Entity-Relation Graph DS expresses relationships between different entities. The output of the symbol processor enables identification of relations such as more active than or most active, or faster than, bigger than, greener than etc. Thus the class of corresponding Entity Relation Graphs can be instantiated in the compressed domain.

There are basic DS's such as the Time DS, Media Locator DS, Grids, Histograms that are applicable to all the DS's and are hence of prime importance. Processing the output from the symbol processor 450 in the encoder 320 can populate all of these descriptor schemes. Using the time stamp information present in the compressed bitstream for example can populate the Time DS, which is a very important feature for surveillance applications.

MPEG-7 also includes "higher-level" DS's that express textual description (annotation DS), Conceptual Aspects (e.g., Semantic DS) and Intrinsic Properties of Content (e.g., Model DS's).

In short, the information provided by the system demux 110, the front end parser 440 and the symbol processor 450 can be used to instantiate a powerful subset of description schemes.

Security Event Detection

Automatic security event detection involves inference of higher level information from lower level information, because only lower level information can be acquired directly and automatically. In a simple example, consider detecting an intruder entering a secured area. Observers monitoring the area would, of course, immediately detect the intruder by noting the change in the semantic or high-level features of the area. Our automatic security event detection system, on the other hand, has to rely exclusively on automatic processing of the audio-visual information acquired by the camera. The audio-visual information (signal) from the camera includes only low level features such as color, motion, audio volume etc., and does not include semantic information such a labeled secure area and intruder. However, in general, the semantic events, such as the entry of an intruder, has a direct impact on the lower level features of the audio-visual scene captured by the camera.

In the simple example described above, the motion activity of the secured area is zero in the absence of an intruder because there are no moving objects in the scene. As soon as an intruder enters, motion activity increases suddenly. After the intruder leaves, the motion activity once again subsides to its usual low value. In this case, the motion features of the audiovisual scene alone suffice to detect the beginning and end of the intrusion. Similarly, the face of the intruder, if exposed, would trigger off changes in the texture of the scene, which would indicate the presence of a face in the scene. The entry will also cause an increase in the audio volume.

The key point is that changes in the lower level features of the captured audio-visual information often indicate changes in the semantic content of the scene. The entry of an intruder into the secured area is only a simple example of an event. Our system is not restricted to such simple events but to all events that can be detected using low-level features.

Note also that our system is also capable of detecting events in previously recorded audio-visual information. Such "after the fact" surveillance is also of value in security systems.

Another specific example of using low-level features in the event detector 330 is to observe that the event has ended (e.g., intruder has made an exit from the camera view) and extract the parametric motion of the object that caused the event to occur. Parametric motion is a visual descriptor that has been adopted by MPEG-7. Using the parametric motion, the position of the cameras 201–202 can automatically be adjusted to track the event. If it is not possible to continue to track the event with the same camera that detected the event, then the parametric motion can also be used to select other strategically positioned cameras.

In the most general sense, the objective of our surveillance system is to distinguish an abnormal state from a normal state. In the intruder example, changes in state are identified by changes in audio and motion activity, where the audio-visual features of the normal state are substantially zero. However, in most practical security applications, the normal state is non-zero. We refer to this as non-zero normal-state (NZ-NS) surveillance.

As a first example to illustrate NZ-NS surveillance, consider a camera mounted to observe traffic area with stationary and moving people, bicyclists, cars, busses and trucks, and a very complex audio signal. Using MPEG-7 descriptors, and training data, it becomes possible to extract security events such as accidents, assaults, traffic violations, etc. NZ-NS surveillance can also be used in crowed stores to detect shop-lifting, or in casinos to detect cheating. The system is also useful in automated manufacturing facilities to detect misaligned parts on a conveyor belt, smoke or strange noises coming out of one of the machines.

Control Signal Processor

The CSP 340 receives interrupts from the event detector 330 and generates the appropriate control signals to other devices connected in the network of FIG. 2. The control signals can generate a PIP window to appear on a TV when a security event is detected, dial a telephone number and play a pre-recorded message, or send an email, or start up a window on a PC to show the view from one of the cameras. The control signals can be customized according to user preferences. Priorities can also be assigned as to the order of response activities.

Application Scenarios

In a local surveillance application, the SCS 300 provides video content to a monitor/TV and recording devices. It detects events, triggers alarms, and makes contact to persons via telephones. The user can also control the cameras via other compatible devices, such the remote controller. In a remote surveillance application, the SCS 300 perform all of the activities of the local surveillance system with an extension to external monitoring. The external monitoring and control can be done with the remote PC 210.

In a commercial application, the system can effectively eliminate the need to have twenty monitors viewing for twenty different areas. The CSP 340 can automatically select the scene to be monitored depending on the events detected. In addition, the amount of video to be recorded can be greatly reduced by only recording abnormal events.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A surveillance and control system, comprising:
   a feature extraction unit to extract low-level features from a compressed digital video signal;
   a description encoder, coupled to the feature extraction unit, to encode the low-level features as content descriptors;
   an event detector, coupled to the description encoder, to detect security events from the content descriptors; and
   a control signal processor, coupled to the event detector, to generate control signals in response to detecting the security events.

2. The surveillance and control system of claim 1 further comprising a telephone, a personal computer, and a video recorder coupled to each other by a network.

3. The surveillance and control system of claim 1 wherein the network includes a low-bandwidth network for carrying the control signals and a high-bandwidth network for carrying the compressed digital video signal and the content descriptors.

4. The surveillance and control system of claim 1 further comprising:
   a memory unit to store the compressed digital video signal, the content descriptors, the control signals, user input, and user configuration preferences.

5. The surveillance and control system of claim 1 further comprising:
   a symbol processor, coupled to the feature extraction unit, to extract motion vectors and macroblocks and DCT coefficients from the compressed digital video signal.

6. The surveillance and control system of claim 4 further comprising:
   a bitstream processor, connected to the memory unit, to produce an output compressed digital video signal including the compressed digital video signal and the content descriptors.

7. The surveillance and control system of claim 6 herein the output compressed digital video signal is transmitted to a remote video receiver via a network.

8. The surveillance and control system of claim 1 wherein the content descriptors are encoded according to a video encoding standard.

9. The surveillance and control system of claim 1 wherein the encoder generate a summary of the compressed digital video signal according to the content descriptors.

10. The surveillance and control system of claim 9 wherein the summary of the compressed digital video signal is stored in a memory unit.

11. The surveillance and control system of claim 1 wherein the content descriptors are based on motion activity in the compressed digital video signal.

12. The surveillance and control system of claim 1 further comprising at least one camera, a monitor, a video recorder, a telephone, a storage device, a personal computer, a digital versatile disk, and a remote PC all connected to each other by a network and operated by the control signals.

13. The surveillance and control system of claim 1 wherein the control signals include security contact information, device control parameters, and routing information.

14. The surveillance and control system of claim 1 wherein a normal non-zero state is distinguished from an abnormal non-zero state in the compressed digital video signal to detect the security events.

15. The surveillance and control system of claim 1 wherein the control signals have associated priorities.

16. A method for responding to security events, comprising:
   dynamically extracting low-level features from a compressed digital video signal;
   encoding low-level features as content descriptors;
   detect security events from the content descriptors; and
   generating control signals in response to detecting the security events.

* * * * *